United States Patent Office 2,942,977
Patented June 28, 1960

2,942,977

PREPARATION OF GROWTH FACTORS

James C. Lewis, Kosuke Ijichi, and Precious A. Thompson, Berkeley, and John A. Garibaldi, San Francisco, Calif., assignors to the United States of America as represented by the Secretary of Agriculture No Drawing. Filed Apr. 16, 1954, Ser. No. 423,860

17 Claims. (Cl. 99—9)

(Granted under Title 35, U.S. Code (1952), sec. 266)

A non-exclusive irrevocable, royalty-free license in the invention herein described, for all governmental purposes, throughout the world, with the power to grant sublicenses for such purposes, is hereby granted to the Government of the United States of America.

This invention relates to the production and recovery of nutritional factors, that is, substances which have growth promoting properties and which are particularly useful for stimulating the growth of chicks and other animals. The invention also concerns the preparation of animals feeds supplemented with such nutritional factors. Further objects and advantages of the invention will be obvious from the description herein.

During the past three decades many individual substances have been found to be essential to the normal growth and well being of animals. Some of these have been identified and even synthesized by chemical or microbiological techniques. The nature of others is still in doubt. A variety of experiments has shown that chick growth may be stimulated by unidentified substances in fish solubles, whey, grass juice, and possibly other materials. It has also been shown in recent years that numerous anti-microbial agents stimulate the growth rate, improve the efficiency of utilization of feed, and lower the mortality of chicks, turkey poults, growing pigs, and other animals. Substances that have been found to be useful in one or more of the above-mentioned applications include some of the sulfa drugs, some of the arsenic acids, and some of the antibiotics including penicillin, chlorotetracycline ("Aureomycin"), oxytetracycline ("Terramycin"), and bacitracin. The mode of action of these substances is not well understood but it is thought that they may cause enhanced synthesis of known or unknown essential nutritional factors by intestinal microorganisms, inhibition of toxin- or disease-producing microorganisms of the digestive tract, or inhibition of intestinal microorganisms which compete with the host animal for essential nutrients.

It has now been found that certain strains of the species *Bacillus subtilis* have the ability to biosynthesize nutritional factors useful for stimulating the growth of chicks and other animals. Thus cultures of the microorganisms, or concentrated preparations thereof, when fed to animals give growth responses which cannot be attributed to any of the known growth factors or to antibiotics which have been described previously and which have been recognized to be nutritionally active. Although the several strains of *B. subtilis* can be distinguished from one another by the nature of the antibiotic agents that each strain produces, it is not yet known whether the individual strains elaborate similar or different nutritive factors. Also it is not known as yet whether the growth stimulating properties of all of these strains are due to their antibiotic constituents or to constituents of a vitamin character such as the unknown nutritive factors in fish solubles, whey, grass juice, etc. It has been found that in the case of one strain the growth stimulating effect is due (at least in part) to a new antibiotic, named aterrimin. Regardless of the nature of the growth-promoting substances, whether they ultimately prove to be of an antibiotic nature or of a vitamin nature, or unlike either of these types, the fact of the matter is that cultures or concentrates of these strains give growth responses that have practical significance as shown in the examples hereinafter.

The organisms which are used in carrying out this invention are hitherto unknown strains of *B. subtilis* which were isolated from soil. Cultures of these organisms have been deposited in the Stock Culture Collection of the Northern Regional Research Laboratory, Peoria, Illinois, as Nos. NRRL B-1466, NRRL B-1471, and NRRL B-1474. The general taxonomic properties of these strains are in accord with the characteristics of the *B. subtilis* species set forth by Smith, Gordon, and Clark in Monograph No. 16 of the U.S. Department of Agriculture, November 1952, entitled "Aerobic Sporeforming Bacteria," page 73, line 6 to page 74, line 21. Although the general taxonomic characteristics of the strains which we use conform to those of all strains of *B. subtilis*, the strains we use differ markedly from the known strains in many important respects, as follows: (1) The strains we employ have the ability to elaborate growth stimulating factors as discussed above; scores of other strains have been found to be incapable of producing these growth factors. (2) The strains disclosed herein have the ability to grow rapidly and efficiently under artificial culture conditions, that is, in aerobic, submerged culture in simple nutrient-containing liquid medium. It has been found for example that these strains grown under such conditions produce yields of bacterial cells in the range 19 to 40%. This percentage yield refers to the dry weight of the bacterial cells in proportion to the weight of the sugar supplied as the carbohydrate nutrient. These yields are surprisingly high and unobtainable with many other strains of this species. (3) Although the strains used in the process of this invention elaborate antibiotic agents, they do not elaborate subtilin, bacitracin, or any of the other antibiotics which have been shown to be elaborated by antibiotic-producing members of the genus Bacillus.

The strain NRRL B-1471 because it produced a blue-black pigment on media containing readily utilized carbohydrates, was classified as *B. subtilis* variety *aterrimus*. However, this variety readily loses the property of pigment production and inasmuch as there is no reason to assume that pigment production is correlated with the production of the growth stimulating factors, this invention encompasses the use of this particular strain whether it is in pigmented phase or a non-pigmented phase.

The species *B. subtilis* is recognized among the aerobic sporeforming rod-shaped bacteria by the morphology of the sporagia, fermentation reactions, and ability to grow under specialized conditions. In addition, varieties are recognized on the basis of pigment formation. However, these criteria are not sufficiently refined to distinguish the strains of *B. subtilis* which are the subject of this invention from other strains which lack value for feed supplementation or for which the value is unknown. As criteria for such a differentiation we have chosen to use the "antibiotic patterns" of the strains. The term "antibiotic pattern" refers to the fact that many antibiotic strains of Bacillus produce a series of antibiotics rather than a single antibiotic. It has been convenient to use for purposes of differentiation and identification (*a*) the relative sensitivity of various test bacteria to particular antibiotics and (*b*) the relative migration of the antibiotics on paper chromatograms with development by various solvents.

None of the three strains of *B. subtilis* specified herein as a source of feed supplements exerts a marked degree of antibiotic action on the Gram negative bacteria *Escherichia coli* and *Serratia marcescens*. This provides a distinction from the various strains or species of Bacillus that produce the antibiotics polymixin, circulin, polypeptin, tyrocidine, gramicidin S, laterosporin, and others less well characterized that inhibit Gram negative bacteria. Other common antibiotics active against Gram negative bacteria but not known to be produced by strains of Bacillus, such as streptomycin, chloramphenicol ("Chloromycetin"), chlorotetracycline ("Aureomycin"), oxytetracycline ("Terramycin"), erythromycin ("Ilotycin"), and others, likewise are excluded.

Antibiotic activity has been detected in various of the strains of B. subtilis specified herein as sources of feed supplements against one or more of the following test organisms: *B. megaterium* NRRL B–938, *Micrococcus flavus* ATCC 10240, and *Lactobacillus leichmanii* ATCC 4797.

A highly useful solvent mixture for paper chromatographic differentiation of antibiotics from Bacillus consists of the solvents t-butyl alcohol and glacial acetic acid in the proportions by volume of 74:3; and enough water to give a total volume of 100. This solvent mixture will be designated as solvent I. The other solvent mixtures are described below, following Table I, and are designated as solvents II, III, etc. The antibiotic pattern of the various strains of *B. subtilis*, expressed as $R_f$ values obtained by chromatographing crude cultures of the strains, is set forth below in Table I.

*terium* and *L. leichmanii*, was highly active for *M. flavus*.

The results of paper chromatography customarily are given as "$R_f$ values" which vary in magnitude from 0 to 1 and which represent the migration of a constituent relative to the migration of the solvent. Samples may be chromatographed with a single solvent ("one-dimensional chromatography") or they may be chromatographed successively with two solvents. In the latter case it is customary to migrate the sample parallel to one edge of a square sheet of paper with one solvent, then to dry the paper and remigrate the constituents with a second solvent in a direction at a right angle to the first direction. This gives a "two-dimensional chromatogram" for which the migration of each constituent is given by a pair of $R_f$ values.

The usefulness of $R_f$ values for describing and differentiating the antibiotic patterns of the strains of *B. subtilis* involved in this invention is illustrated by Table I. For example, it will be noted that strain NRRL B–1466 gives two antibiotic spots in solvent I; these will be designated as 1466:I–0 and 1466:I–1, respectively. Other antibiotics will be designated similarly as is necessary for brevity.

If a two-dimensional chromatogram has been made it is possible to measure the $R_f$ values for a second solvent of the individual components resolved by the first solvent.

TABLE I

*Antibiotic patterns (expressed as $R_f$ values) of the strains of B. subtilis used in accordance with this invention*

| Strain | $R_f$ values | | | | |
|---|---|---|---|---|---|
| | 1st direction Solvent I | 2nd direction Solvent II | 2nd direction Solvent III | 2nd direction Solvent IV | 2nd direction Solvent V |
| NRRL B–1466 | 0 | 0 to 0.45 | 0 | 0, 0.95 | 0. |
| | 1 | 0 | 0 to 0.25 | 0.25 (0.15 to 0.85) | 0.7. |
| NRRL B–1471 | 0 | 0 | 0 | 0.95 | 1. |
| | 1 | 0, 0.35 | 0, 1 | 0.1 to 0.8 | 0.8 (0.5 to 0.95). |
| NRRL B–1474 | 0 | 0 | 0 | 0.75 | 1. |
| | 0.37 | 0 | 0 | 0 to 0.35 | 1. |
| | 0.6 | not detected | 0 | not detected | not detected. |
| | 0.95 | 0 | 0, 1 | 0.2 to 0.8 | 0.4 to 1. |

The solvents used in the above chromatographic tests are described as follows:

Solvent I was made up of 74 volumes of t-butyl alcohol, 3 volumes of acetic acid and sufficient water to make 100 volumes. Solvent II contained by volume: methyl alcohol, 25; acetic acid, 3; and water, sufficient to make 100. Solvent III contained by volume: ethyl acetate, 88; acetic acid, 6; and water to make 100 volumes. Solvent IV contained 70 volumes of acetone and sufficient water to make 100 volumes. Solvent V contained 80 volumes of t-butyl alcohol and sufficient water to make 100 volumes. In using solvents IV and V, the chromatographs were exposed to the vapors of aqueous ammonia during development.

*B. megaterium* was used for detection for all of the $R_f$ values shown above in Table I. Identical spots were given by *B. megaterium* and by *L. leichmanii* in solvents I and II with NRRL B–1466; this strain has insignificant activity for *M. flavus*. Strain NRRL B–1471 has activity for *L. leichmanii* and *M. flavus* but the chromatographic locations of these activities were not determined. Strain NRRL B–1474 possesses activity for all three test organisms as does the spot 1474:I–0. The spot 1474:I–0.35 was active for both *B. megaterium* and *M. flavus* but not for *L. leichmanii*. The spot 1474:I–0.95 was active for *B. megaterium* and *L. leichmanii* but not *M. flavus*. The spot 1474:I–0.6, which shows little activity for *B. mega*-

Thus 1466:I–1 has an $R_f$ value of 0 in solvent II; accordingly this antibiotic may be specified more precisely as 1466:I–1; II–0. The antibiotic specificity may also be used for further differentiation; for example, 1466:I–0; II–0 to 0.45 is active against *B. megaterium* and *L. leichmanii* but not *M. flavus*; on the other hand, 1471:I–0; II–0 is active against all three test organisms.

Detailed inspection of Table I will show that the strains differ markedly from each other in their antibiotic patterns so that it is clear that in this respect the strains are distinct. Furthermore, it may be noted that each of the antibiotics in any strain is distinct from each of the antibiotics in the other strains.

It is also of interest to show that none of the known antibiotics from the genus Bacillus that are active against Gram positive bacteria are produced as a major constituent by *B. subtilis* strains NRRL B–1466, NRRL B–1471, or NRRL B–1474. For this purpose the $R_f$ values (by one-dimensional chromatography) for such of these antibiotics as were available in purified form are given in Table II. It should be mentioned first, however, in Table II that "aterrimin" is a hitherto unreported antibiotic from *B. subtilis* NRRL B–1471 which gives the spot designated as 1471:I–0.95; II–0 in Table I. The preparation of aterrimin is described in the copending application of Gordon Alderton and Neva S. Snell, Serial No. 423,865 filed April 16, 1954, now abandoned.

TABLE II

*R*$_f$ *values for one-dimensional chromatography of purified antibiotics*

| Antibiotic | Solvent I | Solvent II | Solvent III |
|---|---|---|---|
| licheniformin | 0 | 0.4 to 1 | 0 |
| subtilin | 0.15 | 0 to 0.8 | 0 |
| vivicil | 0.45 | 0.95 | 0 |
| bacitracin | 0.65 | 0.85 | 0 |
| polypeptin | 0.7 | 0.7 | 0 |
| laterosporin B | 0.85 | 0.9 | 0 |
| laterosporin A | 0.9 | 0.85 | 0 |
| tyrocidine | 0.9 | 0.45 | 0.03 |
| aterrimin | 0.95 to 1 | 0, 0.35 | 0, 1 |
| gramicidin | 1 | 0 | 0, 1 |

In the above tests *B. megaterium* was used for detection of the antibiotics.

It is evident from the data of Table II that several antibiotics gave doublet spots, for example, aterrimin with solvents II and III and gramicidin with solvent III. These sharply-separated doublet spots indicate but do not prove that two components are present. For example, it is well known that doublets can arise by the differential migration of a pure compound which is present in two states of ionization as with the amino acid lycine at certain pH values.

Inspection of Table II shows that only licheniformin with $R_f$ 0 and laterosporins A and B, tyrocidin, aterrimin, and gramicidin with $R_f$ of 0.85 to 1 have migrations in solvent I that are not clearly distinguished from those exhibited by the antibiotics of *B. subtilis* NRRL B-1466, NRRL B-1471, and NRRL B-1474. Inspection of the migrations in other solvents, however, discloses differences in all cases. Licheniformin, for example, gives an $R_f$ of 0.4 to 1 in solvent II which differs from that shown by 1466:I-0, 1471:I-0, and 1474:I-0. Gramicidin gives a doublet in solvent III and thus differs from 1466:I-1; III-0, and 1474:I-0.95; III-1 which do not produce doublets in solvent III.

*B. subtilis* NRRL B-1474 also produces an antibiotic active against a strain of *Micrococcus albus*, but this antibiotic is unstable in neutral or alkaline aqueous solution and it usually may be detected only in cultures that have been freshly harvested before or at the peak of growth. Obviously, all of the cultures may produce antibiotics detectible only with microorganisms other than those we have used and thus a finding with test organisms other than the particular strains we have used would not suffice to distinguish strains of *B. subtilis* from our strains. Also it is well known that the production of antibiotics is dependent on nutritional and other cultural factors so that it would be necessary for a valid differentiation that cultures be compared experimentally in fully parallel trials. Finally it is well known that mutants affecting antibiotic production can be obtained readily. Such mutants may well give active feed supplements and it is to be understood that such mutants are in the scope of this invention.

In applying this invention any one of the herein disclosed strains of *B. subtilis* is cultured on a nutrient medium. Preferably the process is carried out by incubating under aerobic, agitated, submerged conditions a liquid medium inoculated with the selected organism. For animal feeding purposes, the resulting culture medium itself can be added to conventional feeds to provide the growth stimulating factors. Preferably, the medium is concentrated to provide a more highly potent preparation. This concentration may involve evaporating part of the water from the medium to make a syrup, or evaporating essentially all the water from the medium to produce a dry, solid product. Further, special fractionation procedures may be applied to the medium to eliminate water and/or nutritionally-inert solids. The amount of the growth factor containing preparation to be added to animal feeds will vary widely depending, for instance, on the potency of the particular preparation (that is, whether it is a whole medium or is concentrated or dried) and on the degree of growth stimulation desired for the supplemented feed. In general the proportion of the growth factor preparations will be small because of their high physiological activity. Thus, for example, concentrations of as little as 0.025% of whole dried medium in the ration have given desirable growth stimulation in chicks.

As noted above, the growth of the designated strains of *B. subtilis* is preferably carried out in a liquid medium under aerated, agitated and submerged conditions as giving the highest yields together with efficiency and economy of operation. In carrying out such cultures, the sterilized liquid medium is placed in a fermentation vessel, inoculated with the selected strain of *B. subtilis* and then air is continuously forced into the inoculated medium while it is subjected to agitation. Under such conditions the cells are dispersed throughout the medium and are kept in intimate contact with the air and with the nutrients present in the medium. As a result growth of the microorganism proceeds rapidly and the nutrients are utilized efficiently.

The cultures of *B. subtilis* are generally stored in nutrient agar slants. For preparing inoculum for submerged culture, transplants are usually made into shallow layers of experimental media in Erlenmeyer flasks and incubated at 25° C. to 35° C. for 48 hours using a shake technique. The contents of the flasks are then thoroughly agitated and 50–100 ml. of the resulting suspension used to inoculate 1 liter of culture medium. The inoculum can also be prepared on a small scale under submerged conditions according to the process herein disclosed. High yields of the growth factors in the shortest time can be produced if the inoculum is grown under submerged conditions on the same medium as intended to be used in the larger-scale submerged culture and the inoculation is carried out at the time when cell production is at a maximum rate in the inoculum culture.

In carrying out the process of this invention under the preferred technique of submerged conditions, many types of apparatus can be used. The essentials to be provided are a vessel equipped with stirring device and means for introducing air during the run and means for cooling or heating the contents of the vessel. Many refinements may be added such as thermometers, sampling devices, inlets for introducing materials, mechanical foam breakers, and so forth. It is preferable to employ some stirring or agitating device to disperse the air entering the system with the medium. Such device may be a mechanical agitator, for example. Further, it is possible to utilize the air entering the system for agitation as well as for the metabolism of the organism. For this purpose air may be introduced through orifices whereby turbulence of the culture will be obtained. Another method of providing agitation is to continuously circulate the culture medium through a pump. In such case the air may be introduced directly into the pump or into the pump line whereby it will be thoroughly dispersed with the culture medium.

During submerged culture excessive foaming is sometimes encountered. This can be controlled by adding a chemical de-foaming agent or by mechanical devices. Commercial de-foaming agents suitable for this purpose are available on the market. A suitable example is a monoglycerine dissolved in lard oil; another is octadecanol, which for convenience in adding small quantities thereof, may be diluted with purified mineral oil (liquid petrolatum) or lard oil. Mechanical foam breakers such as disclosed by Humfeld (Jour. Bacteriology, vol. 54, p. 689), may be used instead of chemical means.

In culturing the selected strains of *B. subtilis* by any technique, air must be available to the organism. In culturing under submerged conditions, air must be actually introduced into the culture. It is most convenient to introduce the air at the bottom of the fermentation vessel through a sparger or other mechanical device to break up the air into fine bubbles. Usually an excess of air is provided to supply air for growth and to act as an agitating means. Thus the volume of air introduced may be from about 0.1 to about 2 liters per minute per liter of medium.

In general, the culture of the microorganisms is harvested when the cell growth is at a maximum. This point can be determined by measuring the turbidity of the culture with optical instruments from time to time since increased cell concentration increases the turbidity of the liquid medium. Estimates of cell production may also be obtained by centrifuging samples of the culture at intervals. In some cases the production of the growth factors will lag somewhat behind cell production. Thus to obtain maximum yield of growth factors, the culture may be incubated several hours after maximum cell production is reached. Using media of the type herein described, production of the growth factors is at a maximum in about 10 to 24 hours.

The *B. subtilis* strains may be grown on many different media. In essence, the medium should provide, besides water, (1) a source of energy, (2) a source of nitrogen, and (3) suitable minerals.

The source of energy may be a carbohydrate, as for example, sucrose, dextrose, fructose, maltose, solubilized starch, dextrin, and so forth. Instead of carbohydrates, polyhydric alcohols may be used, as for example, glycerol, mannitol, sorbitol, and so forth. Of course some of these energy sources are more readily utilized by the bacillus and hence higher yields of the growth factors are produced under otherwise identical conditions. Usually we prefer to use sucrose or dextrose (or materials containing them) as being relatively low in cost and yet productive of high yields. The concentration of the energy source should be enough to provide sufficient nutrient for good growth of the organism; in general, concentrations from about 5 to about 10% can be used. It is sometimes advantageous to use a lower concentration, say from 1% to 5% and add additional amounts of the energy material as the culture proceeds and the material is used up. It is not essential to use purified, individual compounds as the source of energy. Thus one may employ corn syrup, corn sugar, invert sugar, beet or cane molasses, syrups made from fruit cannery wastes, or cereal worts derived from wheat, oats, barley, malted barley, rice, etc. The cereal worts may be subjected to complete or partial saccharification with a diastatic enzyme or other hydrolytic agent to render the energy material more readily assimilable by the bacillus.

The source of nitrogen may be an organic or inorganic nitrogen derivative. In the organic category may be mentioned proteins, hydrolyzed proteins, enzyme-digested proteins, amino acids, yeast extract, asparagine, and urea. For reasons of economy it is usually preferable to employ an inorganic compound such as ammonia, ammonium hydroxide, or salts thereof such as ammonium phosphate, ammonium citrate, ammonium acetate, ammonium sulphate, ammonium nitrate and so forth. In general, the concentration of nitrogen should be from about 0.075 to 1%. A very convenient method of supplying nitrogen is to add ammonium hydroxide periodically during the course of the culture. In this way the pH of the culture can be kept constant and the requisite nitrogen is supplied. For this purpose ammonia gas also can be bubbled directly into the culture.

In addition to the energy and nitrogen sources, mineral nutrients are also required for the medium. Thus potassium, sulphur and phosphorus are required. These elements may be supplied in the form of their salts. Thus the potassium may be supplied as potassium chloride, phosphate, sulphate, citrate, acetate, nitrate, and so forth. Sulphur and phosphorus are supplied in the form of sulphates or phosphates such as alkali metal or ammonium sulphates and alkali metal or ammonium sulphates and alkali metal or ammonium phosphates. These elements, potassium, sulphur, and phosphorus, are generally added to the medium in a concentration of from about 100 to about 1,000 p.p.m. of each. (The abbreviation "p.p.m." used herein means parts per million.) In addition, the following minerals are required in trace amounts (from about 1 to about 100 p.p.m. of each): zinc, iron, manganese, magnesium, calcium, and cobalt. In preparing media from refined materials such as chemically pure sugar and ammonium salts it is essential to add these trace elements. However, where the medium is made from technical-grade materials such a beet or cane molasses, asparagus juice, worts from cereals and so forth, then trace elements are usually already present. If trace elements are to be deliberately added to the medium one can use any suitable salt thereof as the chlorides, sulphates, nitrates, and so forth.

The addition of citric acid or other organic acid (or water-soluble salt thereof such as the alkali metal or ammonium salt) to the medium is often beneficial to act as a buffer and to keep the various salts in solution. Citric acid is especially beneficial where the concentration of iron, magnesium, calcium, or phosphorus is too high due, for example, to impurities in the materials used. Thus an addition of from about 0.05% to about 0.5% citric acid gives good results. Instead of using purified citric or other organic acid one can use materials containing the same or similar acids such as asparagus juice, alfalfa juice, beet molasses, Steffen's waste liquor and other agricultural materials of this type.

The pH of the culture may vary from about 5.5 to about 7.5. If the pH is not controlled during the fermentation, the pH will drop as the organism reproduces. Hence it is preferable to keep the pH within the stated range during the entire run. This can be accomplished by using a buffer. For example, phosphoric acid, citric acid, or other weak organic acid may be added to the culture either as such or in the form of their water-soluble salts, i.e., their sodium, potassium, or ammonium salts. Another method of controlling the pH is to add an alkaline material in small portions as the run proceeds. For this purpose one may use the hydroxides of sodium, potassium, or ammonium, or ammonia gas. As set forth above, ammonium hydroxide or ammonia are preferred for this purpose as they not only serve to regulate the pH but are also nutrients for the organism.

The temperature of the culture can be varied from about 25° C. to about 40° C. Since the rate of growth of the organism increased as the temperature is raised, it is preferred to use a temperature from about 35° C. to about 40° C. In maintaining proper temperature levels it is usually necessary to heat the system during early stages of growth whereas as the culture proceeds it will be observed that heat is generated in the culture and hence cooling will be required to keep the culture at the desired temperature. Thus in working up large batches it is preferred to use a vessel which is equipped with a jacket or coil into which can be introduced a heating or a cooling medium by suitable control of valves and so forth.

The growth factors can be produced in a continuous manner in the following way: A medium is prepared containing water, the mineral nutrients, citrates if necessary, and small amounts of the energy source and the nitrogen source. These latter two components are added only in sufficient quantity to enable initial growth to proceed. The media is sterilized, cooled, then inoculated and culturing started under the conditions set forth herein. Then as the growth proceeds, additional sources of energy, nitrogen, and other nutritional essentials are added at intervals or continuously to maintain growth of the bacillus. After a good growth of the organism is established, portions of the culture are withdrawn from time to time or continuously for use as the source of the growth factors.

As noted above, the growth stimulating factors produced in accordance with this invention can be prepared in many forms. Thus the whole cultures may be concentrated in evaporating apparatus to produce a syrup form of the product. Also the culture or concentrates thereof may be dried to the solid state by the use of such apparatus as spray dryers, drum dryers, tray driers, etc. To prevent heat damage to the products, it is preferred to use apparatus adapted to carry out such dehydration under vacuum whereby the temperature needed for dehydration may be lower than where atmospheric pressure prevails. A useful procedure to obtain a dry solid product involves first concentrating the culture, preferably under vacuum, to obtain a liquid concentrate containing in the order of 15 to 35% solids. This concentrate is then subjected to dehydration in a vacuum dehydrator of the tray, drum, or belt type. During the dehydration the concentrate is subjected to vacuum and to a temperature on the order of 100–250° F. The concentrate being high in solids content will tend to puff extensively during such drying operation yielding a product of porous texture and which is easy to break up with small fragments which have a free-flowing character. To assist in the expansion of the concentrate during drying, it is often desirable to add a drying aid, for example, dextrin, gelatin, pectin, sodium carboxymethyl cellulose, methyl cellulose, corn syrup solids, alginic acid, yeast, and so forth. In some cases it is advantageous to add an inert diluent such as paper pulp, rice bran, ground bagasse, ground corn cobs, ground oyster shells, etc., to prevent the product from forming a hard gummy mass during dehydration.

In some cases, it is not essential to concentrate or dehydrate the entire culture to get a product of increased growth stimulating activity. Thus the culture may be fractionated to eliminate inert materials and thus reduce the bulk of material which needs to be concentrated or dehydrated. Such fractionation is particularly useful in connection with cultures of the NRRL B–1471 organism. Thus it has been found that when cultures of this organism are first acidified to a pH of about 2 to 3.5 the precipitated material contains about 90% of the growth activity, only 10% being in the liquid phase. By centrifugation the precipitated material including the bacterial cells can be isolated from the relatively inactive supernatant. Thus the fractionation achieved by acidification of the culture and centrifugation results in a simple means of separating the active material from a gross quantity of the medium. Naturally the dehydration of the precipitated material will afford great economies as compared with dehydrating the entire culture. The precipitated material can be dehydrated for use as a supplement by the use of a drum drier or any of the techniques or equipment discussed above in connection with the dehydration of the whole cultures. This technique of fractionation is disclosed herein in Example V. As disclosed in this example the efficiency of the fractionation can be increased by repeating the centrifugation several times to get rid of supernatant liquid occluded with the cream-like precipitate.

The growth activity of the NRRL B–1471 strain is believed to be primarily due to a substance of antibiotic character which has been named "aterrimin." When the acidification and centrifugation steps are applied to the culture it is this material which becomes concentrated in the creamy precipitate. It is shown in Example III herein that this antibiotic material is primarily in the precipitate and has an $R_f$ value of 1 in the solvent system described in Example III as contrasted with an unstable antibiotic factor also present in the culture which has an $R_f$ value of 0.

The aterrimin or growth factor concentrated in the precipitate obtained by acidification and centrifugation of NRRL B–1471 cultures can be further fractionated to obtain it in a relatively refined state so that it can be used in minute proportions to supplement feeds. To this end the precipitate referred to above is extracted with n-butyl alcohol which preferentially dissolves the active material. To separate impurities from the butanol extract it may be treated with salt and filtered to remove insoluble inactive substances. The addition of salt also causes separation of an aqueous phase containing soluble inactive materials. The resulting purified butanol extract is then dried and the residue re-extracted with a small proportion of n-butyl alcohol to form a purified extract of the aterrimin. This purified extract as such or evaporated to dryness can be used as a very concentrated and refined form of the active growth stimulant. The fractionation treatment outlined above and illustrated in Example VII provides a relatively simple and economical method of concentrating the active material and does away with concentrating and dehydrating large volumes of material mostly of inert nature.

The following examples demonstrate the invention in greater detail. These examples are submitted by way of illustration and not limitation.

EXAMPLE I.—CULTURE OF NRRL B–1471

A sterile medium was prepared containing the following ingredients dissolved in water.

| Material: | Concentration g./liter |
|---|---|
| Beet molasses | 85 |
| Diammonium phosphate | 8.5 |
| Diammonium citrate | 10.0 |
| Potassium sulphate | 2.0 |

In addition to the above ingredients, metal chloride salts were present in amounts to furnish the following concentration of metallic ions.

| Ion: | Concentration mg./liter |
|---|---|
| Mg | 50 |
| Ca | 20 |
| Mn | 50 |
| Fe | 5 |
| Zn | 5 |
| Co | 2 |

The pH of the medium was adjusted to 7 by addition of ammonium hydroxide. Ten liters of the above medium contained in a fermenter similar to that disclosed by Humfield et al. (U.S. Patent No. 2,542,031, February 20, 1951), was inoculated with 400 ml. of a shake culture of *B. subtilis* var. *aterrimus* NRRL B–1471. This shake culture had been prepared by inoculating 400 ml. of the beet molasses medium with a slant culture of the organism and then incubating 22 hours at 35° C. on a shaking machine.

The incubated medium was fermented at 35° C. employing constant agitation and forcing air into the medium at the rate of approximately 10 liters of air per minute. The pH of the culture was maintained at 6.3 to 7.0 by addition of ammonium hydroxide as needed. The growth of the organism was measured turbidimetrically in arbitrary units proportional to the optical density of the culture. The following log indicates the growth obtained.

| Age of culture, hrs.: | Turbidity (arbitrary units) |
|---|---|
| 0 | 270 |
| 2 | 350 |
| 3.5 | 530 |
| 5 | 920 |
| 6 | 1380 |
| 7 | 2200 |
| 8 | 4000 |
| 9 | 4500 |
| 10 | 3700 |

At maximum growth (9 hours), the amount of cellular material on a dry basis was 28% of the sugar present.

The entire culture was vacuum concentrated at 50° C. and 30 inches Hg vacuum to about one-fifth the original volume. Into this concentrate was stirred an amount of corn syrup solids (500 grams), approximately equal to the weight of solids in the concentrate. The resulting mixture was poured in a shallow layer in a pan and frozen. The pan was then placed in a vacuum drier and dried for 24 hours at 30 inches vacuum without application of heat, then for 24 hours under the same vacuum at 38° C. The culture was thus reduced to a dry, concentrated product which could be readily ground and mixed with feeds.

EXAMPLE II.—FEEDING TESTS ON DRIED CULTURE NRRL B–1471

Feeding tests were carried out on the vacuum dried product prepared as described in Example I. It is to be noted that half of the weight of this product was the corn syrup solids added as a drying aid in the vacuum dehydration step. For comparative purposes, tests were also made of the non-supplemented basal ration and the basal ration supplemented with penicillin.

The basal ration used in these tests had the following composition:

| | |
|---|---|
| Wheat bran | 5%. |
| Wheat middlings | 5%. |
| Dehydrated alfalfa leaf meal | 5%. |
| Soybean oil meal | 32%. |
| Steamed bone meal | 2%. |
| Ground yellow corn | 43.3%. |
| Granite grit | 2%. |
| Limestone grit | 2%. |
| Iodized salt | 0.5%. |
| Fish oil | 0.2%. |
| $MnSO_4$ | 0.025%. |
| Fish meal | 3.0%. |
| Riboflavin | 0.15 mg. per 100 gm. ration. |
| Choline | 100 mg. per 100 gm. ration. |
| Vitamin B–12 | 3 micrograms per 100 g. ration. |

The protein content was slightly in excess of 20%.

Nineteen commercial hatchery run New Hampshire chicks of both sexes were placed in each of 4 groups, and were fed the basal ration with the supplements indicated for 10 weeks. The weights of the chicks and the efficiency of feed utilization after 4 and 10 weeks were as follows:

| Feed supplement | Av. wt. of chicks in grams or percentage of control at— | | Feed required per gram of grain expressed in grams or percentage of control at— | |
|---|---|---|---|---|
| | 4 weeks | 10 weeks | 4 weeks | 10 weeks |
| No supplement (control)_g__ | 256 | 1,137 | 2.10 | 2.67 |
| Procaine penicillin G, 10 p.p.m._____percent__ | 117 | 106 | 86 | 94 |
| Vacuum dried product of Ex. I, 0.05_____percent__ | 109 | 107 | 96 | 93 |
| Vacuum dried product of Ex. I, 0.15_____percent__ | 111 | 110 | 95 | 91 |

Thus it is evident from the above that whereas penicillin gave the greater stimulation at 4 weeks, the product of Example I gave the greater stimulation at 10 weeks when the birds were of marketable weight. A beneficial effect on the efficiency of feed utilization also is shown by the product of Example I.

EXAMPLE III.—EXPERIMENTS ON FRACTIONATION OF NRRL B–1471 CULTURE

B. subtilis var. aterrimus NRRL B–1471 was grown in shake flask culture on the beet molasses medium described in Example I.

Aliquots of the culture were adjusted to pH 2, 3, 4, and 5, respectively, by addition of hydrochloric acid. The samples were then centrifuged to separate the precipitates and supernatants. Ascending paper chromatography was then employed on these fractions using a solvent mixture containing 60% acetone, 2.5% acetic acid, and 37.5% water for the purpose of separating the two antibiotic factors produced by the organism. The chromatographs were developed bioautographically against B. megaterium NRRL B–938 in beet molasses agar plates. The chromatographs of the cultures showed two antibiotic factors to be present with $R_f$ values of 0 and 1, respectively. The various fractions showed the following approximate distribution of the $R_f$ 1 activity:

| Precipitation conditions | $R_f$ 1 activity, Percent | |
|---|---|---|
| | in supernatant | in precipitate |
| pH 2 | 10 | 90. |
| pH 3 | 10 | 90. |
| pH 4 | 90 | 10. |
| pH 5 | more than 90 | less than 10. |

EXAMPLE IV.—LARGE SCALE CULTURE OF NRRL B–1471

The inoculum for a 2000 gallon fermentation was built up as follows:

The growth on an agar slant of the organism NRRL B–1471 was washed into a Fernbach flask containing 400 ml. of sterile beet molasses medium as described in Example I. Two such flasks were incubated for 11 hrs. at 35° C. on a reciprocating shaking machine. These were used to inoculate 10 liters of beet molasses medium in a fermenter as described by Humfeld et al. (Patent No. 2,542,031). The growth period in this fermenter under aerated, agitated submerged conditions was 5½ hrs. at 35° C. During this time, the turbidity increased from 970 to more than 2350 units (arbitrary). At this time the culture was used to inoculate 30 gallons of the medium as described in Example I but containing cane molasses instead of beet molasses. The inoculated media was cultured as before for six hours, the turbidity increasing from 1700 to 4600 arbitrary units. The resulting culture was then used to inoculate the final batch of 2000 gallons of sugar cane molasses medium. This medium contained the following ingredients dissolved in sufficient water to make 2000 gallons:

| | | |
|---|---|---|
| Cane molasses | lbs__ | 1700 |
| $(NH_4)_2HPO_4$ | lbs__ | 68 |
| $(NH_4)_2SO_4$ | lbs__ | 17 |
| KCl | lbs__ | 13 |
| $ZnCl_2$ | g__ | 76 |
| $FeCl_3$ | g__ | 190 |
| $MgSO_4 \cdot 7H_2O$ | lbs__ | 8.4 |
| $MnSO_4 \cdot 4H_2O$ | lbs__ | 4.0 |

The density of this media was 8.6° Brix. The fermentation was conducted under aerated agitated submerged conditions at a temperature of 35° C. The pH was maintained in the range 6 to 7 by addition of ammonium hydroxide solution at intervals. After 10 hours under these conditions, the turbidity reached a maximum of 5000 arbitrary units. At 12 hours the fermentation was stopped by shutting off the air supply and cooling the culture.

EXAMPLE V.—FRACTIONATION OF NRRL B-1471 CULTURE

A. The whole culture produced as described in Example IV was acidified to pH 3.0 with sulphuric acid and the precipitate formed was isolated by passing the acidified culture through a continuous centrifuge of the yeast separator type. The resulting cream-like mass (970 gallons) was divided into two equal parts each part being treated separately as follows:

B. One half of the cream-like mass (485 gallons) from step A was concentrated by slurrying in water and centrifuging, each of these steps being carried out twice. The concentrated creamy mass was mixed with an equal volume of brewers' yeast slurry containing the same proportion of solids, the yeast being added as a drying aid. The resulting mixture was drum dried. This product (V-B) was used as a supplement for a basal ration and tested as set forth below in Example VI. It is to be noted that the yeast present in this product does not add any nutrients not already present in adequate amount in the basal ration.

C. One half of the creamy mass from step A was re-centrifuged to concentrate it by removing additional amounts of liquid. The resulting 250 gallons of cream-like material was adjusted to pH 2.5 by the addition of sulphuric acid and the acidified mass passed through a supercentrifuge to effect a further concentration by removal of free liquid. This step yielded 37.5 lbs. of a barely flowable paste. This product (V-C) was used as a supplement for a basal ration and tested as set forth below in Example VI.

EXAMPLE VI.—FEEDING TESTS ON FRACTIONATED PRODUCT (B-1471)

Feeding tests were conducted using the products of Example V as supplements. For comparative purposes, in a duplicate set of experiments, penicillin was added in addition to the products of Example V as supplements to the basal ration.

The feeding tests and the basal ration used were the same as in Example II, except that 20 chicks were used per pen. The materials used and the results obtained are set forth below:

|  | Average weight of chicks in grams or percentage of control at 4 weeks | |
|---|---|---|
|  | without penicillin | with 10 p.p.m. procaine penicillin G |
|  |  | Percent |
| No supplement (control) | 287 g | 120 |
| V-B. {Product dried with yeast 0.15% | 104% | 120 |
| {Product dried with yeast 0.5% | 116% | 119 |
| V-C. {Moist product from supercentrifuge 0.15% | 106% | 114 |
| {Moist product from supercentrifuge 0.5% | 115% | 124 |

It will be seen that the higher concentrations of these two products (V-B and V-C) gave growth responses within the same range as were given by penicillin. The 0.5% supplement of the product dried with yeast (V-B) corresponds to approx. 8 ml. of liquid whole culture per 100 g. of ration and the 0.5% supplement of moist supercentrifuge cake (V-C) corresponds to 18 ml. of liquid whole culture per 100 g. of ration.

EXAMPLE VII.—BUTANOL FRACTIONATION OF NRRL B-1471 CULTURE

The organism NRRL B-1471 was grown under aerated agitated submerged conditions on a liquid media as set forth in Example I.

A. The resulting culture was acidified to pH 2.5 by the addition of concentrated hydrochloric acid. The precipitate including bacterial cells was isolated by centrifuging. For tests to be described later the precipitate was labeled VII-A-1, the supernatant liquid VII-A-2.

B. The precipitate from step A was blended with distilled water to give a volume of 615 ml. and the pH of the mixture adjusted to 2.5 by addition of hydrochloric acid; to this material was added 650 ml. of normal butyl alcohol and the mixture after thorough agitation was centrifuged to isolate the desired butanol extract from the aqueous phase. The aqueous phase was re-extracted three times using 600 ml. of butanol in each operation. In these extractions additional water was added as necessary so that the volume of aqueous liquid and butanol would be about the same. Also the pH was maintained at pH 2.5 by addition of hydrochloric acid as needed. The four butanol extracts were then combined. For tests to be described below, the combined extract was labeled VII-B-1; the residue from the extraction VII-B-2.

C. To the combined butanol extract from step B was added 200 g. sodium chloride and 5 ml. distilled water; the pH was adjusted to 5.0 by addition of sodium hydroxide. After stirring the mixture for 2 hours at room temperature it was filtered to remove undesired insoluble material and after allowing the filtrate to stand, the butanol phase was separated from the aqueous phase containing soluble impurities. The butanol phase was then evaporated under vacuum at room temperature to dryness.

D. The dry residue from step C was extracted 5 times with a total of 150 ml. of n-butanol leaving a residue of salt and insoluble brown material. The butanol extract, being a concentrated form of the growth-stimulating factor, was then made up to a volume of 160 ml. by addition of butanol. For tests to be described below the butanol extract was labeled VII D-1. the residues from the butanol extractions was labeled VII D-2. Paper chromatography of several of the fractions described above, conducted as in Example III gave the following distribution of the antibiotic factors. As mentioned hereinabove, the $R_f1$ antibiotic has been named aterrimin.

| Material | $R_f0$ activity, percent of total | $R_f1$ activity, percent of total |
|---|---|---|
| Whole culture | 100 | 100. |
| VII A-1, ppt. from culture at pH 2.5 | 20 | 90. |
| VII A-2, Supernatant from culture at pH 2.5. | 80 | 10. |
| VII B-1, combined butanol extracts | less than 15 | 90. |
| VII B-2, residue from butanol extraction | less than 10 | less than 5. |
| VII D-1, butanol extract | less than 1 | 75. |
| VII D-2, residue from butanol extraction | less than 3 | less than 10. |

EXAMPLE VIII.—FEEDING TESTS ON BUTANOL-FRACTIONATED MATERIAL FROM NRRL B-1471

Feeding tests were carried out using the product of Example VII, that is, the butanol extract (product VII D-1) as a supplement the same basal ration as in Ex. II. The tests were conducted on groups of 20 commercial hatchery New Hampshire chicks. For comparative purposes some of the lots of chicks were fed the basal ration by itself, this ration supplemented penicillin, and this ration supplemented with the dried, combined residues from the butanol extractions in Example VII, parts B, C, and D.

The materials used and the results obtained are tabulated below:

| Feed supplement | Average weight of chicks in grams or percentage of control at— | | Feed required per gram of gain expressed in grams or percentage of control at— | |
|---|---|---|---|---|
| | 4 weeks | 10 weeks | 4 weeks | 10 weeks |
| No supplement (control)__g__ | 271 | 1,168 | 2.80 | 3.43 |
| Procaine penicillin G, 10 p.p.m._____percent__ | 122 | 107 | 73 | 78 |
| Dried combined residues from butanol extractions, 0.4%_____percent__ | 111 | 106 | 86 | 88 |
| Dried combined residues from butanol extractions, 0.2%_____percent__ | 107 | 99 | 78 | 79 |
| Butanol extract (Prod. VII D-1) 0.1%_____percent__ | 122 | 105 | 73 | 89 |
| Butanol extract (Prod. VII D-1) 0.033%____percent__ | 111 | 105 | 86 | 89 |

Inasmuch as 0.4% of the dried residue from the butanol extractions corresponded to 74 ml. of the original liquid whole culture per 100 g. of ration and 0.1% of the liquid butanol extract corresponded to 6.2 ml. of liquid whole culture per 100 g. of ration it is clear that approx. 90% of the chick-growth promoting activity appeared in the butanol extract as compared with the extraction residue.

EXAMPLE IX.—FEEDING TESTS ON DRIED CULTURE OF NRRL B-1474

The organism *B. subtilis* NRRL B-1474 was grown in a liquid medium under aerated agitated submerged conditions using the same medium and conditions as set forth in Example IV. The whole culture was drum dried at atmospheric pressure to produce a solid feed supplement.

The dried product was fed to chicks in the manner described in Example II and using the same basal ration. The results are tabulated below:

| Feed supplement | Average weight of chicks in grams or percentage of control at— | | Feed required per gram of gain expressed in grams or percentage of control at— | |
|---|---|---|---|---|
| | 4 weeks | 10 weeks | 4 weeks | 10 weeks |
| No supplement (control)__g__ | 263 | 1238 | 2.49 | 3.08 |
| Procaine penicillin G, 10 g. per ton_____percent__ | 124 | 107 | 79 | 83 |
| Drum dried product (NRRL B-1474), 3%____percent__ | 117 | 105 | 83 | 75 |
| Drum dried product (NRRL B-1474), 3%, plus procaine penicillin G, 10 g. per ton_____percent__ | 128 | 110 | 79 | 76 |

EXAMPLE X.—FEEDING TESTS ON DRIED CELLS OF NRRL B-1474

The organism *B. subtilis* NRRL B-1474 was grown in a liquid medium under aerated, agitated submerged conditions using the same medium and conditions as set forth in Example IV. The culture was then subjected to centrifugation to isolate the bacterial cells from the medium. The cellular material so separated was dried on a conventional drum drier operated at atmospheric pressure.

Feeding tests were then conducted using the drum dried product as a supplement to a basal ration. These tests were conducted on groups of 10 commercial hatchery New Hampshire male chicks. For comparative purposes, some of the lots of chicks were fed the basal ration by itself or this ration supplement with known antibiotic growth promoting agents.

The basal ration had the following composition:

| | Percent |
|---|---|
| Ground yellow corn | 55 |
| Ground heavy oats | 2.5 |
| Wheat mixed feed | 2.5 |
| Alfalfa meal | 2 |
| Meat scraps | 5 |
| Soybean oil meal | 30 |
| Bone meal | 1 |
| Ground limestone | 0.75 |
| Salt | 0.25 |
| Commercial broiler supplement | 0.25 |
| Manganese sulfate | 0.025 |
| Vitamin $B_{12}$ supplement to give 7.5 mg. $B_{12}$ per ton | 7.05 |

The materials used and the results obtained are set forth below:

| Feed supplement | Average weight of chicks in grams or percentage of control at— | |
|---|---|---|
| | 4 weeks | 9 weeks |
| (1) No supplement (control)_____g__ | 301 | 1197 |
| (2) Commercial supplement of chlorotetracycline ("Aureomycin"), 9 g. of antibiotic per ton percent__ | 106 | 103 |
| (3) Commercial supplement of oxytetracycline ("Terramycin"), 10 g. of antibiotic per ton percent__ | 108 | 98 |
| (4) Commercial supplement of bacitracin, 10 g. of antibiotic per ton_____percent__ | 111 | 101 |
| (5) Drum dried product (NRRL B-1474), 0.25% percent__ | 102 | 102 |
| (6) Drum dried product (NRRL B-1474), 0.5% percent__ | 106 | 100 |
| (7) Drum dried product (NRRL B-1474), 1% percent__ | 113 | 108 |
| (8) Drum dried product (NRRL B-1474), 2% percent__ | 103 | 106 |
| (9) Drum dried product (NRRL B-1474), 4% percent__ | 125 | 110 |

EXAMPLE XI.—CULTURE OF NRRL B-1466

A large lot of a feed supplement derived from *B. subtilis* NRRL B-1466 was prepared using the following technique:

The organism was first grown for 6½ hours on 10 liters of a cane molasses medium under aerated, agitated, submerged conditions. The resulting culture was used to inoculate a 30 gallon batch of the same medium and growth was carried out for 4½ hours under the same conditions as described above for Example IV. The resulting culture was then used to inoculate a 3000 gallon batch of the same medium and growth was carried out under the same aerated, agitated and submerged conditions as before. In all three runs the temperature was maintained at 35° C. and the pH maintained between 6 and 7 by addition of ammonium hydroxide solution at intervals. The following log illustrates the increase of cells during the 3000 gallon fermentation:

| Age (hours) | Cell volume (percent) | Turbidity (arbitrary units) |
|---|---|---|
| 1 | 1.0 | 400 |
| 2 | 1.0 | 470 |
| 3 | 1.3 | 670 |
| 4 | 1.4 | |
| 5 | 1.8 | 1,300 |
| 6 | 2.8 | 1,900 |
| 7 | 3.5 | |
| 8 | 4.8 | |
| 9 | 8.0 | |
| 10 | 8.0 | 3,800 |

The fermentation was stopped at 13 hours.

The medium used in the three fermentations was the same as in Example IV except that in this case beet molasses was used instead of cane molasses. The processing of the resulting 3000 gallon culture was as follows: The culture was recycled twice through an evaporator operating at atmospheric pressure which yielded a syrup with a Brix of 11. To 400 gallons of this syrup, 50 pounds of pulverized paper pulp was added as a drying aid and mixed thoroughly with the syrup. The resulting mixture was drum dried.

EXAMPLE XII.—FEEDING TESTS ON DRIED CULTURE NRRL B-1466

Feeding tests were conducted using the drum dried product of Example XI as a supplement to a basal ration. These tests were conducted on lots of commercial-hatchery New Hampshire male chicks. For comparative purposes, some of the lots of chicks were fed the basal ration by itself and this ration supplemented with known growth promoting agents.

The basal ration had the following composition:

| | Percent |
|---|---|
| Ground yellow corn | 56.75 |
| Ground heavy oats | 2.5 |
| Meat scraps (50% protein) | 1.5 |
| Fish meal (62% protein) | 3.5 |
| Soybean oil meal (41% protein) | 32.5 |
| Bone meal | 1.5 |
| Ground limestone | 1.0 |
| Salt | 0.5 |
| Manganese sulfate | 0.025 |
| Vitamin A concentrate (5000 units) | 0.05 |
| Vitamin $B_{12}$ supplement (4 mg. per lb.) | 0.05 |
| Commercial broiler supplement | 0.25 |

The materials used and the results obtained are set forth below:

| Feed supplement | Average weight of chicks in grams or percentage of control at— | | |
|---|---|---|---|
| | 4 weeks | 8 weeks | 10 weeks |
| (1) No supplement (control) g | 314 | 997 | 1,411 |
| (2) Condensed fish solubles, 3% percent | 109 | 103 | 100 |
| (3) Cond. fish sol. (3%) plus procaine penicillin G, 2 g. per ton percent | 111 | 110 | 110 |
| (4) Product of Ex. XI (B-1466), 0.06% percent | 104 | 101 | 101 |
| (5) Product of Ex. XI (B-1466), 0.125% percent | 118 | 109 | 107 |
| (6) Product of Ex. XI (B-1466), 0.25% percent | 110 | 113 | 117 |
| (7) Product of Ex. XI (B-1466), 0.8% percent | 118 | 111 | 108 |

Having thus described our invention, we claim:

1. A process for preparing a growth promoting factor which comprises incubating under aerobic conditions a nutrient medium inoculated with a strain of Bacillus subtilis selected from the group consisting of NRRL B-1466, NRRL B-1471, and NRRL B-1474 and thereafter recovering a composition containing a growth promoting factor from the culture.

2. The process of claim 1 wherein the strain is NRRL B-1466.

3. The process of claim 1 wherein the strain is NRRL B-1471.

4. The process of claim 1 wherein the strain is NRRL B-1474.

5. A process for preparing an animal feed which comprises incubating under aerobic conditions a nutrient medium inoculated with a strain of Bacillus subtilis selected from the group consisting of NRRL B-1466, NRRL B-1471, and NRRL B-1474, and thereafter concentrating the resulting culture and admixing therewith an animal feed whereby said animal feed is enhanced with an essential growth factor.

6. The process of claim 5 wherein the straing is NRRL B-1466.

7. The process of claim 5 wherein the strain is NRRL B-1471.

8. The process of claim 5 wherein the strain is NRRL B-1474.

9. A method of correcting the nutritive deficiency of an animal feed containing mainly edible vegetable material which comprises adding to the feed a physiologically adequate amount of a growth promoting factor produced by incubating under aerobic conditions a nutrient medium inoculated with a strain of Bacillus subtilis selected from the group consisting of NRRL B-1466, NRRL B-1471, and NRRL B-1474.

10. The process of claim 9 wherein the strain is NRRL B-1466.

11. The process of claim 9 wherein the strain is NRRL B-1471.

12. The process of claim 9 wherein the strain is NRRL B-1474.

13. A process of stimulating the growth of animals in the early stage of their life which comprises supplying the animals with a diet containing a physiologically adequate amount of a growth promoting factor produced by incubating under aerobic conditions a nutrient medium inoculated with a strain of acillus subtilis selected from the group consisting of NRRL B-1466, NRRL B-1471, and NRRL B-1474.

14. The process of claim 13 wherein the strain is NRRL B-1466.

15. The process of claim 13 wherein the strain is NRRL B-1471.

16. The process of claim 13 wherein the strain is NRRL B-1474.

17. A process for preparing a growth promoting factor which comprises incubating under aerobic conditions a nutrient medium inoculated with a strain of Bacillus subtilis selected from the group consisting of NRRL B-1466, NRRL B-1471, and NRRL B-1474, and concentrating the resulting medium.

References Cited in the file of this patent

UNITED STATES PATENTS

| 2,498,165 | Johnson et al. | Feb. 21, 1950 |
| 2,738,274 | Le Mense | Mar. 13, 1956 |

OTHER REFERENCES

Bergey's Manual of Determinative Bacteriology, 6th edition, 1948, Williams and Wilkins Co., Baltimore, page 711.

Brande et al.: Antibiotics and Chemotherapy, vol. 3, March 1953, pages 271–291, pages 272 and 273 are specifically relied upon.